United States Patent [19]

Fukumura

[11] Patent Number: 4,542,531
[45] Date of Patent: Sep. 17, 1985

[54] RADIO TRANSMITTER/RECEIVERS WITH NON INTERFERRING LOCAL OSCILLATOR FREQUENCY

[75] Inventor: Yukio Fukumura, Tokyo, Japan

[73] Assignee: Nippon Electric Co., Ltd., Tokyo, Japan

[21] Appl. No.: 475,539

[22] Filed: Mar. 15, 1983

[30] Foreign Application Priority Data

Mar. 18, 1982 [JP] Japan ................................. 57-43966

[51] Int. Cl.$^4$ .............................................. H04B 1/40
[52] U.S. Cl. ......................................... 455/76; 455/86
[58] Field of Search ................................ 455/76–79, 455/86, 87

[56] References Cited

U.S. PATENT DOCUMENTS

| | | | |
|---|---|---|---|
| 3,983,484 | 9/1976 | Hodama | 455/76 |
| 4,002,995 | 1/1977 | Reed | 455/76 |
| 4,097,805 | 6/1978 | Fujii et al. | 455/76 |
| 4,225,828 | 9/1980 | Watanabe et al. | 455/87 |
| 4,231,116 | 10/1980 | Sekiguchi et al. | 455/87 |
| 4,476,575 | 10/1984 | Franke et al. | 455/76 |

*Primary Examiner*—Jin F. Ng
*Attorney, Agent, or Firm*—Charles E. Pfund

[57] ABSTRACT

In a radio transmitter/receiver comprising a transmitter, a superheterodyne receiver, and a local oscillator for supplying a local oscillation signal to the superheterodyne receiver, the intermediate frequency $f_{if}$ of the superheterodyne receiver is set to have a value expressed by $$f_{if} = (2K-1) \times f_{ch}/2$$

where $f_{ch}$ represents a frequency spacing between radio frequencies assigned to a communication and K represents a natural number.

3 Claims, 3 Drawing Figures

RADIO TRANSMITTER/RECEIVERS WITH NON INTERFERRING LOCAL OSCILLATOR FREQUENCY

BACKGROUND OF THE INVENTION

This invention relates to a radio transmitter/receiver in which unwanted radiation from a local oscillator does not act as an interferring wave.

In recent years, as the number of mobile radio transmitter/receivers increases, interference is increasingly caused by unwanted radiations from the radio transmitter/receiver. Particularly, the interference due to unwanted radiations from the local oscillator of a transmitter/receiver raises a serious problem because once power is supplied to the radio transmitter/receiver, this type of interferring wave is constantly radiated. For example, in a multi-channel type radio transmitter/receiver in which one channel is used as a control channel and the other channels are used as talking channels, when the control channel is interferred with unwanted radiation of the radio transmitter/receiver of its own system or other system, the performance of the system will be adversely affected. Especially, when the interference is caused by a moving radio transmitter/receiver, it is difficult to find out a source of interference.

Heretofore, in the receivers operating at VHF and UHF bands, intermediate frequencies which are integer multiples of a frequency spacing of 20 KHz or 25 KHz of radio channels of 10.7 MHz, 21.4 MHz, 45 MHz and 70 MHz have been used. The frequencies of the radio channels have also been integer multiples of the frequency spacing. Accordingly, the frequencies of the local oscillators have been integer multiples of the frequency spacings so that when local oscillation waves are radiated from a local oscillator, another radio device would be interferred.

SUMMARY OF THE INVENTION

Accordingly, it is an object of this invention to provide an improved radio transmitter/receiver capable of preventing interference to other radio devices caused by unwanted radiation from a local oscillator of the radio transmitter/receiver.

Another object of this invention is to provide a novel radio transmitter/receiver capable of readily determining a transmission frequency.

Still another object of this invention is to provide a radio transmitter/receiver of the multi-channel type in which it is not necessary to provide any transmission oscillator.

The basic principle of this invention lies in that the intermediate frequency is made to be an odd multiple of one half a channel frequency spacing. Then, the local oscillation frequency also becomes an odd multiple of half the frequency spacing which does not coincide with the radio channel frequency, thereby minimizing the interference.

According to this invention, there is provided a radio transmitter/receiver comprising a transmitter, a superheterodyne receiver, and a local oscillator for supplying a local oscillation signal to the superheterodyne receiver, wherein an intermediate frequency $f_{if}$ of the superheterodyne receiver is set to have a value expressed by, $$f_{if}=(2K-1)\times f_{ch}/2$$

where $f_{ch}$ represents a frequency spacing between radio channel frequencies assigned to a communication band, and K represents a natural number.

According to one embodiment, in a radio transmitter/receiver in which the transmission frequency of the transmitter and the receiving frequency of the superheterodyne receiver differ from each other, the local oscillator is constituted by a digital frequency synthesizer and the output of the local oscillator is supplied to the transmitter.

DESCRIPTION OF THE PREFERRED EMBODIMENT

Figure 1:
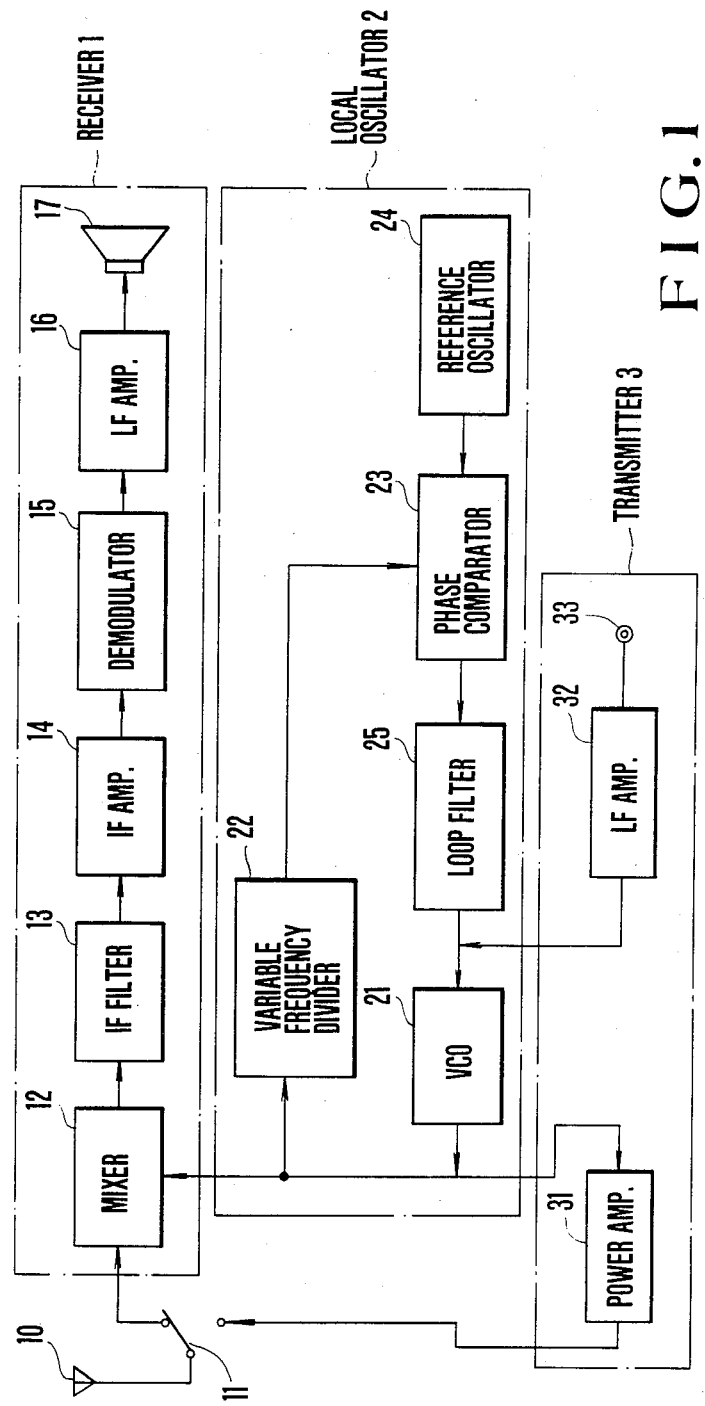
FIG. 1 is a block diagram showing a preferred embodiment of this invention.

A preferred embodiment of this invention shown in FIG. 1 comprises a receiver 1, a local oscillator 2, utilizing a digital frequency synthesizer, and a transmitter 3.

A radio wave received by an antenna 10 is sent to a mixer 12 through an antenna duplexer 11. The mixer 12 mixes together the local oscillation wave of the local oscillator 2 and the received wave to form an intermediate frequency signal. Unwanted signals in the intermediate frequency signal are removed by an intermediate frequency filter 13 and then the intermediate signal is amplified by an intermediate frequency amplifier 14 and demodulated by a demodulator 15. The demodulated signal is amplified by a low frequency amplifier 16 and then supplied to a loudspeaker 17 to produce a voice output. Thus, the receiver 2 is of a well known superheterodyne type.

The local oscillator 2 is constituted by a digital frequency synthesizer as shown in FIG. 1. In the local oscillator, the output of a voltage controlled oscillator (VCO) 21 is frequency divided by a variable frequency divider 22 whose output is supplied to a phase comparator 23 to be compared with the output frequency of a reference oscillator 24, and the phase error is applied to the voltage controlled oscillator 21 through a loop filter 25.

In the transmitter 3, a voice signal produced by a microphone 33 is amplified by a low frequency amplifier 32 and then supplied to the voltage controlled oscillator 21 to effect frequency modulation. The output of the voltage controlled oscillator 21, that is, the output of the local oscillator 2 is amplified to a predetermined power level by a power amplifier 31 whose output is radiated through antenna 10 via the antenna duplexer 11.

With the above construction, according to the present invention, the intermediate frequency $f_{if}$ of the superheterodyne receiver is set to be an odd multiple of half the frequency spacing $f_{ch}$ between channel frequencies, and it is expressed by, $$f_{if}=(2K-1)=f_{ch}/2$$

where K represents a natural number.

The local oscillator 2 in the form of the digital frequency synthesizer is advantageous because the digital frequency synthesizer is easy to change frequency division so that the intermediate frequency which is an odd multiple of half the frequency spacing in the receiving mode can readily be switched to the transmitting frequency which is an even multiple of half the frequency spacing in the transmission mode, or vice versa.

For example, let us assume that the transmission frequency is 450 MHz, the receiving frequency is 460 MHz and the frequency spacing between adjacent radio channels is 25 KHz. Thus the next lower channel frequency is 450 MHz−25KHz=449,975 MHz. Assume also that the intermediate frequency is selected to be 10.0125 MHz, an odd multiple of a frequency of 25/2 KHz. Where the lower local oscillation frequency is assumed with respect to the received frequency, the local oscillation frequency $f_L$ becomes:

$$f_L = f_R - F_{if}$$

or $$f_L = 460 - 10.0125 = 449.9875 \text{ MHz}$$

Where the output frequency of the reference oscillator 24 is equal to 12.5 KHz, the frequency division ratio N of the variable frequency divider 22 that is needed for this value of $f_L$ is $$N = 449.9875/0.0125 = 35999$$

at the time of receiving, while at the time of transmission ($f_T$=450 MHz) it becomes $$N = 450/0.0125 = 36000$$

In other words, when the frequency division ratio N is 36000, the output of the local oscillator 2 becomes 450 MHz, which is a transmission frequency that is amplified by power amplifier 31.

Thus, according to this invention, the local oscillation frequency $f_L$ becomes $$f_L = 449.9875 \text{ MHz}$$

which is different by 12.5 KHz from (i.e. halfway between) the closest radio channel frequencies 449.975 MHz and 450 MHz of the assumed example.

Figure 2:
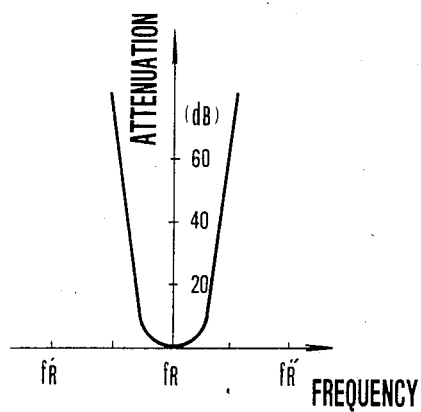
FIG. 2 is a graph showing an attenuation/frequency characteristic of the embodiment shown in FIG. 1.

FIG. 2 shows an attenuation/frequency characteristic of the receiver 1 in which $f_R$ designates a receiving frequency, and $f'_R$ and $f''_R$ show radio channel frequencies. The ordinate shows attenuation in decibel (dB). At frequencies $f'_R$ and $f''_R$, attenuations are sufficiently large, whereas when the receiving frequency shifts by one half the frequency spacing, attenuation of about 70 dB can ordinarily be obtained.

This amount of attenuation is common in communication receivers operating in VHF band and UHF band. For this reason, even when an interferring wave having a frequency different from the receiving frequency by one half of the frequency spacing is present, it causes no trouble. More particularly, the unwanted local oscillation frequency radiated from a radio transmitter/receiver of this invention does not coincide with the radio channel frequencies, and when it is radiated, it can be sufficiently attenuated by an intermediate frequency filter or the like of the receiver.

Figure 3:
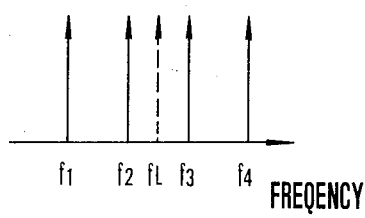
FIG. 3 is a graph showing a frequency spectrum of the embodiment shown in FIG. 1.

FIG. 3 shows the relation among radio channel frequencies $f_1$ to $f_4$ and the local oscillation frequency $f_L$ of this invention. As shown, the local oscillation frequency $f_L$ is positioned half way between radio channel frequencies $f_2$ and $f_3$.

As described above, according to this invention, since the local oscillation frequency is positioned between two adjacent radio channel frequencies, interference which would be caused by unwanted radiation from the local oscillator can be removed at the time of receiving. Furthermore, since a digital frequency synthesizer is used for a local oscillator, a transmission frequency can readily be obtained by varying the ratio of frequency division for transmission at the time of frequency division. This makes it unnecessary to use an independent oscillator for transmission, thereby simplifying the construction of a multi-channel type radio transmitter/receiver.

What is claimed is:

1. A radio transmitter/receiver comprising:
   a transmitter;
   a superheterodyne receiver, and
   a local oscillator for supplying said transmitter and receiver with local signals at a plurality of frequencies;
   said transmitter and receiver operation on a plurality of radio channels with different transmission and reception frequencies for each channel said transmission and reception frequencies being a natural number multiple of the frequency spacing between said radio channels and the output frequencies of said local oscillator being between the transmission frequencies of two adjacent channels
   mixing means in said receiver for mixing an output from said local oscillator with a reception frequency to provide an intermediate frequency $f_{if}$ wherein said intermediate frequency $f_{if}$ of said superheterodyne receiver is set to have a value expressed by $$f_{if} = (2K-1) \times f_{ch}/2$$

where $f_{ch}$ represents a frequency spacing between radio frequencies assigned to adjacent channels, and K represents a natural number.

2. The radio transmitter/receiver according to claim 1 wherein said local oscillator comprises a digital frequency synthesizer and an output of said local oscillator is supplied to said transmitter.

3. The radio transmitter/receiver according to claim 2 wherein the output frequency of said local oscillator is varied by an odd multiple of $f_{ch}/2$ to obtain a transmission frequency.

* * * * *

UNITED STATES PATENT AND TRADEMARK OFFICE
CERTIFICATE OF CORRECTION

PATENT NO. : 4,542,531
DATED : September 17, 1985
INVENTOR(S) : Fukumura

It is certified that error appears in the above-identified patent and that said Letters Patent is hereby corrected as shown below:

Col. 2, l. 64: change "$f_{if}=(2K-1)=f_{ch}/2$" to --$f_{if}=(2K-1) \times f_{ch}/2$--

Col. 4, l. 31: change "operation" to --operating--

Signed and Sealed this

Twenty-fifth Day of February 1986

[SEAL]

Attest:

DONALD J. QUIGG

Attesting Officer

Commissioner of Patents and Trademarks